UNITED STATES PATENT OFFICE.

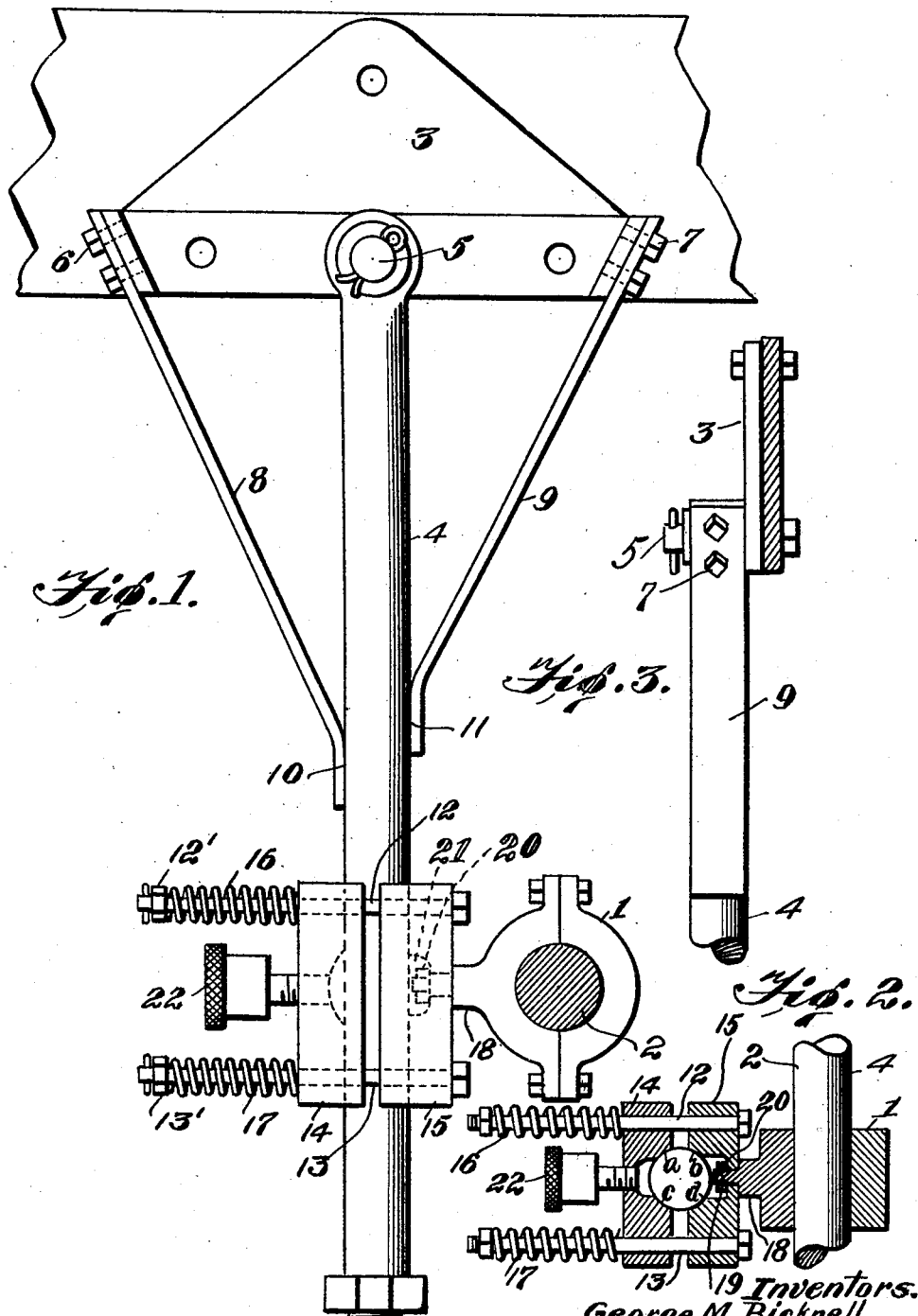

GEORGE M. BICKNELL, OF DETROIT, MICHIGAN, AND HUGH H. C. WEED, OF ST. LOUIS, MISSOURI, ASSIGNORS TO THE CARTER CARBURETER COMPANY, OF ST. LOUIS, MISSOURI, A CORPORATION OF MISSOURI.

FLOATING BEARING.

1,324,372.      Specification of Letters Patent.      Patented Dec. 9, 1919.

Application filed July 15, 1918. Serial No. 245,004.

*To all whom it may concern:*

Be it known that we, GEORGE M. BICKNELL and HUGH H. C. WEED, citizens of the United States, and residing at Detroit, in the county of Wayne, Michigan, and at St. Louis, in the county of St. Louis, Missouri, respectively, have invented certain new and useful Improvements in Floating Bearings, of which the following is a specification.

This invention relates to attachments for bearings adapted for application to rotating shafts, and more particularly to shafts which are subjected to high speed rotation. The primary object of the invention is the prevention of the whipping of shafts.

The generally accepted idea of the so-called whipping is the tendency of high speed shafting to travel, in response to centrifugal force, in a circle larger than the diameter of the shaft. This circular travel is in addition to the rotation of the shaft under applied power. The shafts are ordinarily held in fixed bearings, generally at least two in number, and the portions of the shaft which are subjected to the whipping action are located between the fixed bearings. The circle of travel of the whipping portions would manifestly be around a center which is the center of the shaft when it is at rest. It will be very readily understood that the whipping action is exceedingly destructive to the fixed bearings and to the shaft itself.

As before stated, a whipping shaft travels in a circle larger than its own diameter. Our conception is that any discouragement of the tendency of the shaft to travel in a true circle, by destroying or retarding its continuity of movement, or impulse in a fixed circular direction, will tend to cause the shaft to more nearly assume its normal straight alinement.

The invention is especially adapted for automobile shafting but it is to be clearly understood that it may be advantageously used on any high speed shafts. In automobile drive shafts a very large percentage of the destructive wear on universal joints is occasioned by shaft whipping. This wear has caused the adoption of heavier drive shafts, of abnormal diameter, which manifestly do not whip to so great an extent, because less resilient, but has occasioned a very material increase in cost of production. These heavier shafts are also objectionable in that they add to the burden of the universal joint. With the use of our invention, a long drive shaft of normal diameter will show a smaller degree of whipping tendency, and consequently cause less wear upon the bearings, than will a shaft of the same length and of abnormally large diameter.

We have observed that the whipping action is better retarded by opposing unequal resistance to the tendency of the shaft to swing in a circle. A fixed resistance of the tendency to travel to the left, for instance, should be met by either a greater or less resistance to travel to the right. Moreover, it is obvious that, in order for the shaft to travel in a circular path, the whipping portion must move upwardly and downwardly, at some point in the circle. This resistance may be applied as desired, but it is to be noted that, if equal resistance is moderately applied to movement on all directions, the whipping action will not be entirely eliminated.

Our invention therefore, by providing unequal resistance to shaft movement in different directions, renders a true circular or "whipping" movement impossible, offering at the same time no resistance to the rotative movement within the bearings.

In the accompanying drawings forming a part of this specification, we have illustrated a preferred embodiment of our invention, and have chosen to illustrate the invention applied to the drive shaft of an automobile.

In the drawings—

Figure 1 is a plan view of the device applied to the drive shaft, which is shown in section;

Fig. 2 is a sectional view showing the connection between the shaft bearing and the resistance device; and Fig. 3 is a side elevation of Fig. 1.

The invention comprises preferably a floatable split bearing 1, adapted to surround the rotatable shaft 2. A bracket 3 is fixed to any convenient part of the automobile, such as a cross-member, and adapted to support a rod or bar 4, (hereinafter called a rod) in a position immediately adjacent the bearing 1. The rod 4 is pivoted to the bracket 3, at 5, and hence is adapted for movement to the right or left. Also connected to the bracket 3 at 6 and 7, respectively, are spring members 8 and 9, which bear against opposite sides of the rod 4, and tend to hold said rod in a certain fixed position.

The springs 8 and 9 are here shown as of the same relative dimensions, except length, but the spring 8 contacts the rod 4 at 10, which is below the point 11, where the spring 9 contacts the rod. The springs therefore offer an unequal resistance to any lateral movement of the rod 4. In the drawings, we have shown the spring connections 6 and 7 as equi-distant from the pivot 5, but it is clear that other methods of effecting the unequal resistance might be substituted. Connections 6 and 7 might be at unequal distances from the pivot 5, and the springs 8 and 9 might be of the same dimensions and bearing upon exactly opposite points on the rod 4; or the points 6 and 7 might be positioned as shown in the drawing, and the springs be made of unequal resistance and made to bear upon directly opposite points of the rod 4.

Surrounding the rod 4 is a sliding collar 14', made up of two plates 14 and 15, connected by elongated bolts 12 and 13. As clearly shown in Fig. 1, the bolts 12 and 13 extend beyond the plate 14 and are surrounded by coiled springs 16 and 17, which tend to hold the plates 14 and 15 clamped upon the rod 4, for a purpose to be hereinafter explained. The outer ends of the bolts 12 and 13 are provided with adjusting nuts 12' and 13', respectively, whereby the clamping tension may be regulated, as will be understood. The bearing 1 is connected to the plate 15 by means of an integral shank 18 provided with an extension 19 projecting through the plate 15. The head of the projection 19 is screw threaded and provided with a nut 20, which is contained in a recess 21 formed on the interior face of the plate 15. An oil cup 22 is provided for lubricating the points of contact between the rod 4 and the plates 14 and 15.

As shown in Fig. 2, the interior faces of the plates 14 and 15, are provided with elongated contact points $a$, $b$, $c$ and $d$, for engagement with the rod 4. These contact points are shaped to conform to the configuration of the exterior of the rod 4, whereby sliding contact between the sliding collar 4' and rod is permitted.

From the foregoing it is clear that resistance is always applied to any whipping tendency of the shaft. Any movement of the shaft to the left is imparted to the rod 4, and is resisted by the spring 8. A similar movement to the right is opposed by resistance of the spring 9, and this resistance is unequal to that imparted by the spring 8. It is obvious that vertical movement of the shaft is impossible unless the collar 4' is caused to slide along the rod 4. The springs 16 and 17 clamp the contact points $a$, $b$, $c$ and $d$ of the plates 14 and 15 against the rod 4 however, and thereby present a frictional resistance to any vertical movement thereof.

From the foregoing, it will be clear that we have devised a novel means adapted to effectually prevent the central line of the shaft assuming a circular path of travel, thereby causing said shaft to maintain its substantial alinement.

It is obvious that in actual practice of the invention, lubricating devices, such as oil cups, should be applied to all points where there is frictional contact. Since these devices form no part of my invention, they are not shown in all instances where they would be necessary.

Various modifications of the invention may be suggested to those skilled in the art to which the invention appertains, but we desire to secure by Letters Patent all such embodiments thereof as fall fairly within the scope of the appended claims.

It is to be understood that, while we have shown a member mounted to assume a vertical position adjacent the shaft, the member might just as well be mounted to extend laterally above or below the shaft. In this event, the lateral movement of the member, the bearing, or the shaft, as herein described, both in the specification and claims, might properly be termed a vertical movement, and vice-versa. The appended claims cover this mechanical equivalent.

What we claim is:

1. A device of the character described, comprising, in combination with a rotatable shaft, a floatable bearing engaging the shaft, an element pivoted to rest adjacent the bearing, spring-members adapted to resist bodily movement of said element, and a collar slidably embracing said element and connected to the bearing, substantially as described.

2. A device of the character described, comprising, in combination with a rotatable shaft, a floatable bearing engaging the shaft, an element pivoted to rest adjacent the bearing, spring members engaging said element at opposed points and adapted to resist lateral movement thereof, and a collar slidably embracing said element and connected to the bearing, substantially as described.

3. A device of the character described, comprising, in combination with a rotatable shaft, a floatable bearing engaging the shaft, an element pivoted to rest adjacent the bearing, spring members adapted to unequally resist lateral movement of said element, and a collar slidably embracing said element and connected to the bearing, substantially as described.

4. A device of the character described, comprising, in combination with a rotatable shaft, a floatable bearing engaging the shaft, an element pivoted to rest adjacent the bearing, spring members engaging said element at opposed points and adapted to unequally resist lateral movement thereof, and a collar slidably embracing said element and connected to the bearing, substantially as described.

5. A device of the character described, comprising, in combination with a rotatable shaft, a floatable bearing engaging the shaft, an element pivoted to rest adjacent the bearing, spring members unequally opposing lateral movement of said element, a collar resiliently clamped into sliding engagement with said element, and a shank on said bearing and connected to said collar, substantially as described.

6. A device of the character described, comprising, in combination with a rotatable shaft, a floatable bearing engaging the shaft, an element pivoted to rest adjacent the bearing, spring members unequally opposing lateral movement of said element, a collar resiliently clamped into sliding engagement with said element, and a shank on said bearing extending through an aperture in said collar, substantially as described.

7. A device of the character described, comprising, in combination with a rotatable shaft, a floatable bearing engaging said shaft, an element pivoted to rest adjacent said bearing, spring members unequally opposing lateral movement of said element, a split collar embracing said member adjacent the bearing, spring devices clamping said collar in sliding engagement with said element, and means for connecting said collar to said bearing, substantially as described.

8. A device of the character described comprising, in combination with a rotatable shaft, a floatable bearing engaging said shaft, an element pivoted to rest adjacent said bearing, spring members unequally opposing lateral movement of said element, a split collar embracing said member adjacent the bearing, spring devices clamping said collar in sliding engagement with said element, and a shank extending between said collar and bearing, whereby they are rigidly connected, substantially as described.

9. A device of the character described, comprising in combination with a rotatable shaft, a floatable bearing engaging the shaft, an element pivoted to rest adjacent the bearing, spring members adapted to resist lateral movement of the element, a collar connected to the bearing and slidably embracing said element, the interior face of said collar being provided with elongated contact points shaped to conform to the configuration of the contacting faces of said element, substantially as described.

In testimony whereof we affix our signatures.

GEORGE M. BICKNELL.
HUGH H. C. WEED.